United States Patent [19]

Flory

[11] 4,337,852
[45] Jul. 6, 1982

[54] LOAD CONTROL LINK
[75] Inventor: John F. Flory, Morristown, N.J.
[73] Assignee: Exxon Research & Engineering Co., Florham Park, N.J.
[21] Appl. No.: 152,854
[22] Filed: May 23, 1980
[51] Int. Cl.³ .............................................. F16F 7/12
[52] U.S. Cl. .................................................. 188/375
[58] Field of Search ................ 74/492; 188/1 C, 375; 293/133

[56] References Cited
U.S. PATENT DOCUMENTS

| | | | |
|---|---|---|---|
| 3,096,268 | 7/1963 | Lindsay et al. | 188/1 C |
| 3,354,990 | 11/1967 | Stahl | 188/1 C |
| 3,450,233 | 6/1969 | Massa | 188/1 C |

FOREIGN PATENT DOCUMENTS

1105404  6/1955  France ............................ 188/1 C

Primary Examiner—Duane A. Reger
Attorney, Agent, or Firm—F. Donald Paris; Robert S. Salzman

[57] ABSTRACT

A load control link for limiting maximum dynamic loads in and preventing overstressing of tension members by absorbing some of the energy which causes such loads. The load control link comprises a cylindrical housing, a metal sleeve mounted over a shaft within the housing and a cutting collar mounted at one end of the housing and around the sleeve. The inside radius of the cutting collar is slightly less than the outside radius of the sleeve, and is shaped as a cutting edge. The load control link is connected in series with a tension carrying member, with the end of the shaft which extends through the cutting sleeve connected at one end, and the opposite end of the housing connected at the other end. As the tension load on the control link increases, the shaft tends to be withdrawn from the housing causing metal to be cut from the surface of the sleeve by the cutting collar. The shaft remains stationary in the housing as long as the tension load remains lower than that required to cut metal. When the load is reached cutting begins and the shaft withdraws from the housing. Energy is absorbed by the metal cutting action, thereby providing control of the maximum load and preventing overstressing from occurring.

14 Claims, 11 Drawing Figures

LOAD CONTROL LINK

BACKGROUND OF THE INVENTION

The present invention relates to a load control link and more particularly to a device which is capable of preventing overstressing under tension by limiting or controlling the maximum dynamic load through absorbing energy.

It is generally acknowledged that mooring loads experienced at single point moorings are related to the energy stored in the mooring system. This energy arises from the motions of the moored vessel in response to waves. A mooring system which can absorb a substantial amount of energy will experience lower loads than a relatively stiff mooring system. It is common to provide a mooring design with soft elasticity characteristics in order to maximize energy absorption and thus minimize the mooring loads experienced. The ability to provide elasticity is somewhat restricted by water depth and the properties of mooring hawsers. The ideal mooring system would have a load deflection curve with a constant slope up to the safe working load and a zero slope beyond that load point. A very complicated and elaborate servo-control system conceivably could provide such a load deflection curve; however, the use of such a system would most likely be impractical as part of a mooring system from cost, design and operability standpoints.

Prior art devices employed for controlling and limiting loads through the absorption of energy are disclosed in U.S. Pat. Nos. 3,096,268, Lindsey et al., 3,450,233, Massa, 2,877,170 Greenhalgh et al., and 682,536, Duncanson.

Lindsey et al. illustrate an energy-absorbing device which employs a shaft, a body, a sleeve attached to the body, and a cutter mounted on the shaft and bearing against the sleeve. The sleeve is cut as the cutter is forced along it. As the assembly is compressed due to impact, the kinetic energy of the body is dissipated and the body decelerates to rest. This device is unsatisfactory to serve as a load control link in tensioned lines because it absorbs impact energy and absorbs it in compression rather than in tension. Further, this device cuts metal from the inside of a sleeve which thus forces the sleeve to expand against the outer wall and makes removal difficult.

Greenhalgh et al. is similar to Lindsey et al. with the exception that the cut is made directly on the inside wall of the body instead of on a sleeve. The body must be of a material which has both strength and cutting properties. Further it must be replaced after each cut.

The Massa reference illustrates an energy absorbing device wherein a cutter comprising a disc is housed within the body and cuts along a shaft as the shaft moves axially due to a compression impact load imposed thereon. This cutting action will absorb energy. This particular device is deficient because it works in compression instead of tension. Further in this device the entire shaft must be replaced after each impact.

Finally, Duncanson illustrates a mooring system which includes a spring link for absorbing energy as the load increases, so that the chain does not break as the load increases. This system affords only a limited amount of load energy absorbing ability in that the spring begins to compress at low loads.

In spite of the prior art efforts and attempts at providing energy absorbing devices for controlling and restricting maximum dynamic loads, there still exists the need for a relatively simple device which will effectively limit maximum loads in and prevent overstressing of tension members by absorbing some of the energy in such loads.

SUMMARY OF THE INVENTION

The present invention overcomes the deficiencies of the prior art by providing a unique, simple, tension load control device which will control maximum dynamic tension loads experienced in overstressing situations by permitting deflection to take place without the load increasing above the preset maximum load level, once the applied load reaches the preset load level.

According to the invention there is provided a load control link comprising a metal sleeve which is mounted over a shaft and housed within a cylinder. An eye or other connection means is attached to one end of the cylinder and an eye or other connection means is attached to the end of the shaft which extends beyond the other end of the cylinder. Attached to a flange at the other end of the cylinder is a cutting collar which bears on the surface of the sleeve. The inside diameter of the cutting collar is slightly smaller than the outside diameter of the sleeve, so that the cutting collar will begin to cut metal from the surface of the sleeve when the tension load applied to the end connections exceeds a predetermined value.

According to a preferred embodiment of the invention, when employed in a mooring system such as single point mooring, the device will control maximum mooring load experienced at the mooring by permitting deflection to take place without an increase in mooring load once the applied load reaches a predetermined level. In this embodiment the load control link is connected between the mooring hawser and the chafing chain and thus comprises a part of the mooring system.

Other applications for the load control link according to the present invention are also possible. One such use is to connect the link in the lifting line of a crane or other such lifting apparatus. The link would prevent overstressing by indicating by its extension when an attempt is made to lift an excessive load. Another possible application is to connect a link in each of the mooring lines of a supply boat mooring at an offshore platform. Each link would be set to actuate at the maximum allowable load for the attached line. By preventing failure of one or more of the lines, this avoids breakout of the supply boat and possible damage to the platform. Another application is to connect a link in each guy line of a guyed structure such as a radio transmission tower or an offshore guyed production platform. The load control link would permit a small permanent elongation of the highly stressed guy lines when the structure is subjected to excessive loads due to environmental forces which might otherwise cause failure of a line and lead to complete failure of the structure. The load control link according to this invention has other varied and diverse uses such as in mooring lines at conventional piers and multiple buoy moorings, and in towing lines. Many other uses will become apparent from reading this disclosure.

DESCRIPTION OF THE PREFERRED EMBODIMENT

Figure 1:
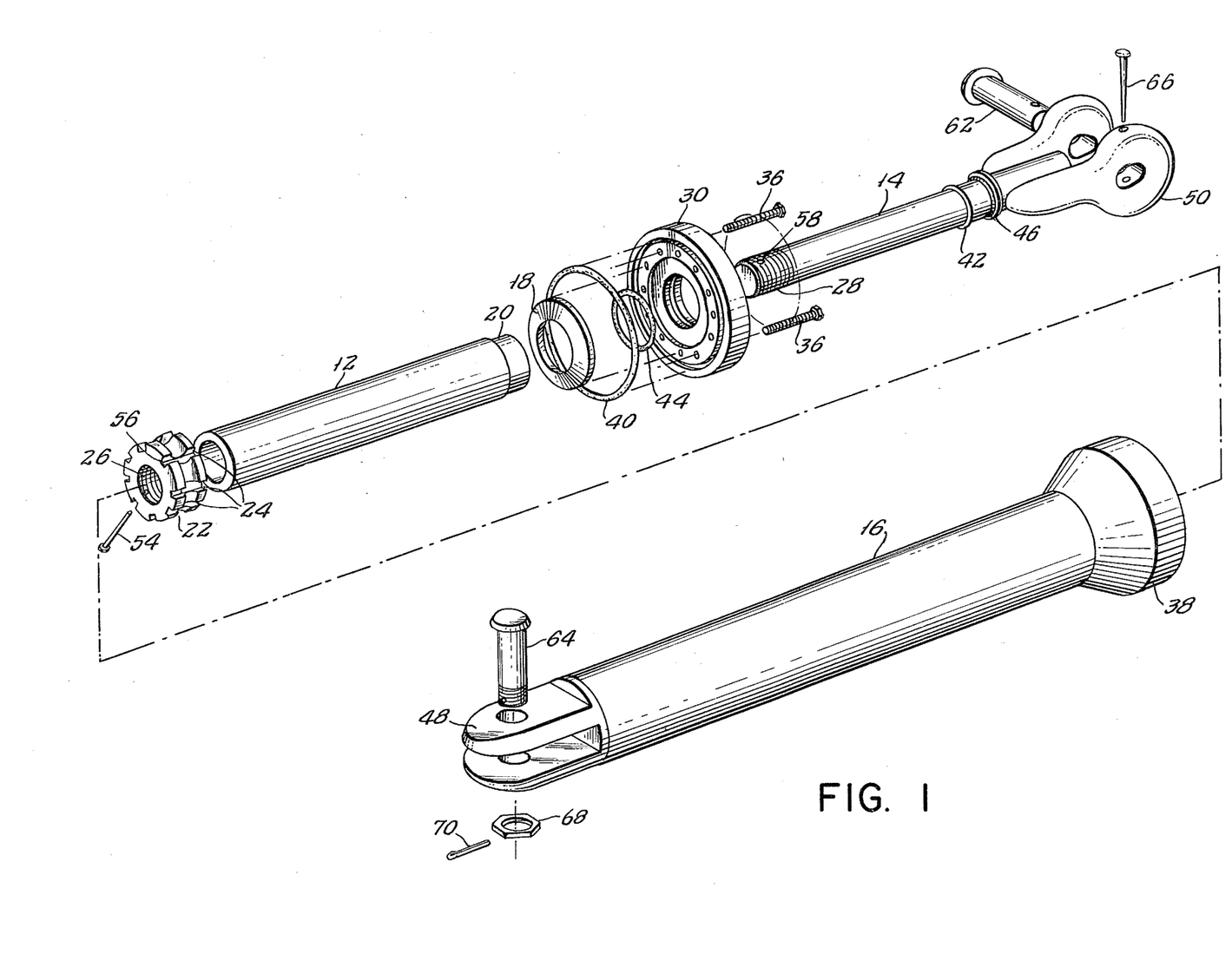
FIG. 1 illustrates an exploded perspective view of a load control link constructed and arranged according to a preferred embodiment of the present invention.
Figure 2:
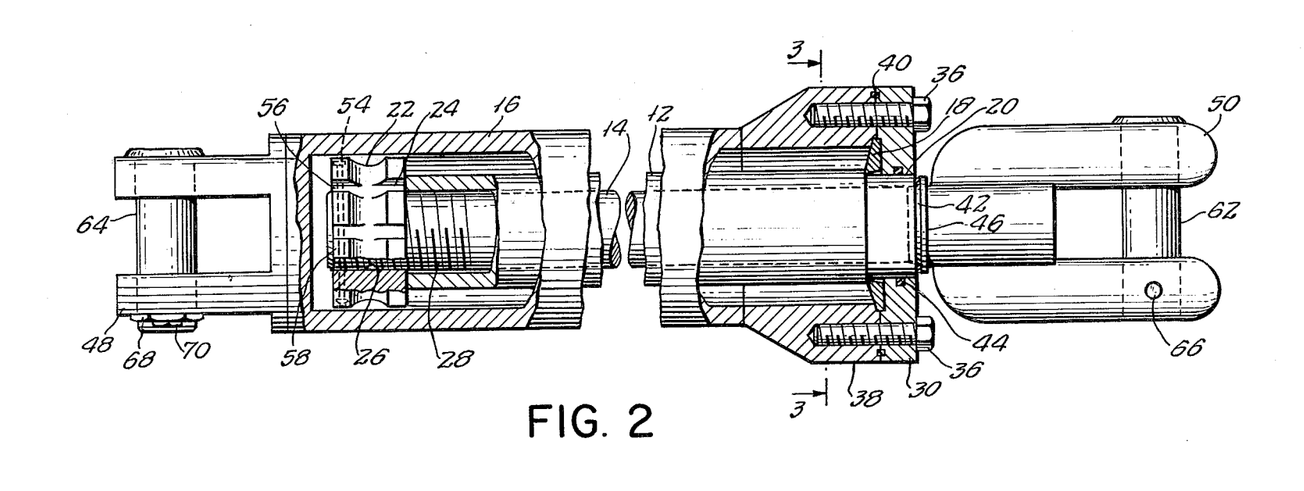
FIG. 2 illustrates a longitudinal cross-sectional view of the load control link of FIG. 1.

Referring now to the drawings wherein like parts are designated throughout the several views by the same reference numeral, there is shown in FIGS. 1 and 2 a load control link 10 comprising a metal sleeve 12 mounted over a shaft 14 and housed within a cylindrical housing 16. A flange plate 30 is attached by bolts 36 to a flange 38 integral with one end of the housing 16. An annular cutting collar 18 has a cutting edge on its inside circumference, is attached to the flange plate 30 by brazing or other suitable means, and is concentric and in contact with the outer surface of the sleeve 12.

The inside diameter of the cutting collar is slightly smaller than the outside diameter of the sleeve at the location of contact therebetween as shown by the recessed portion 20 near the end of the sleeve. At the opposite end of the shaft is a retaining nut 22 for holding the sleeve in place on the shaft 14. Equally-spaced axial extending slots 24 arranged around the periphery of the nut provide means for attaching a spanner wrench (not shown) to tighten the nut. The nut is internally threaded at 26 for mating with threads 28 at the end of the shaft 14.

A small diameter bolt 54 can be placed through holes 56 and 58 in the nut and at the end of the shaft in order to lock the cutting shaft nut onto the shaft.

Between the flange plate 30 and the enlarged part of the cylinder 38 and external of the bolts 36 is a seal 40. An O-ring seal 44 is provided at the inner surface of the flange plate for sealing contact with the recessed sleeve surface 20. An O-ring seal 42 is provided adjacent to the sleeve underlying the shaft radial flange 46. These seals prevent any leakage into the interior of the load control link, which could adversely affect the device.

An eye or clevis 48 is provided on the cylinder 16 opposite the shaft end. An eye or clevis 50 is provided on the end of the shaft which projects out of the cylinder. These eyes or clevises permit shackling the assembly in place in a tension-carrying line, for example, through the use of pins 62 and 64 secured by keeper pins 66 or nuts 68 and cotter pins 70.

The cutting collar 18 begins to cut metal from the surface of the sleeve 12 when the tension load applied to the link exceeds the predetermined value. This load, known as the cutting load, will depend on the outside diameter of the sleeve, the inside diameter of the cutting collar, and the material properties of the sleeve. It can be engineered to actuate or begin cutting at any predetermined load in order to protect a particular system from failure.

Figure 3:
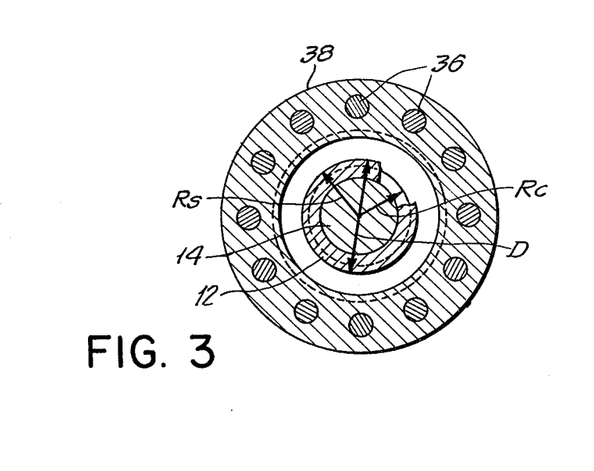
FIG. 3 illustrates a cross-sectional view taken substantially on the line 3—3 of FIG. 2.

Referring to FIG. 3, there is shown a section through the sleeve 12 looking toward the cutting tool 14, with the difference between the inside radius $R_c$ of the cutting collar 18 and the outside radius $R_s$ of the sleeve 12 comprising the cutting radius $\Delta R$. The sleeve diameter is D. The energy expended in cutting a unit volume of metal is known as the specific cutting energy U, and depends upon the metal being cut. In the case of steel, a typical value of U is 300,000 inch pounds/cubic inch, and for aluminum a typical value of U would be 100,000 inch pounds/cubic inch. In designing a load control device according to the present invention to cut at a preset tension load P, the cutting radius can be determined by the formula $\Delta R = R_s - R_c = P/\pi DU$. For a load control link with an aluminum sleeve with a diameter of 5 inches, to have a cutting load of 350,000 lbs., the cutting radius would equal 0.223 inches. For a steel sleeve of the same diameter the cutting radius would be 0.074 inches.

Figure 4:
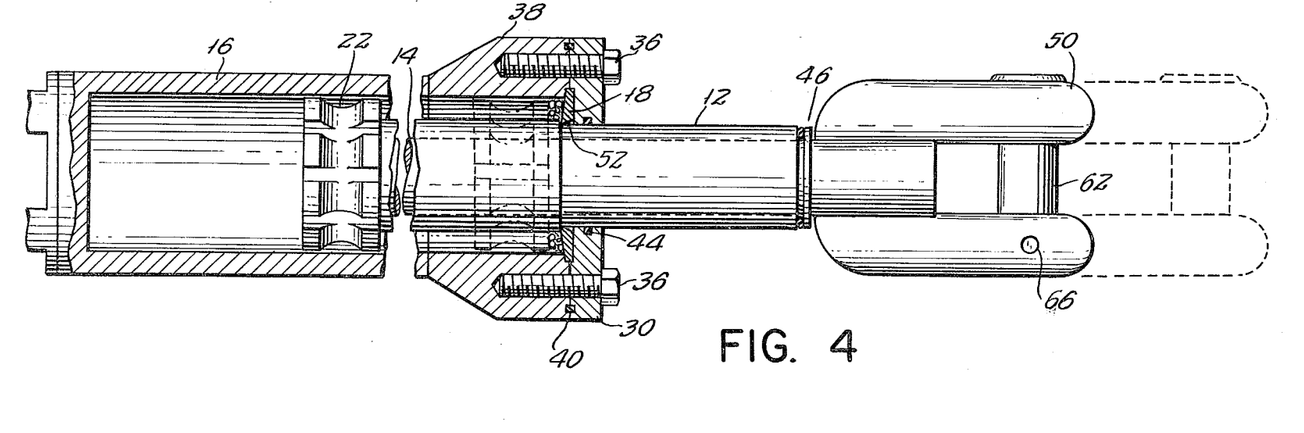
FIG. 4 illustrates a longitudinal cross-sectional view similar to FIG. 2, showing the cutting sleeve in an intermediate position after the shaft has been partially withdrawn and at its extreme position (in broken lines) with the shaft fully withdrawn.

The amount of energy absorbed by the link is a function of the stroke, that is, the length of the sleeve which is drawn through the cutting collar. As the link extends, as shown in FIG. 4, the cutting force will remain essentially constant. Thus, the energy absorbed is the product of the cutting force and the stroke. At the end of the stroke the nut 22 which retains the sleeve 12 on the shaft 14 will come to rest against a cushion of cut metal chips compressed against the flange 30, and no further extension can take place. At that point the link will function as an ordinary load-carrying component of the overall system. The flange plate is designed to carry the full design load after the load link has been fully actuated and the shaft nut has come to rest against the metal chips which are piled against the flange.

Figure 5:
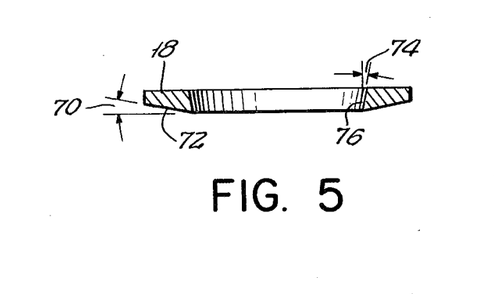
FIG. 5 illustrates a cross-sectional view of the cutting member per se.

The geometry of the cutting collar 18 is important in order to provide smooth cutting. In cross-section the cutting collar should resemble a typical cutting tool designed to cut metal similar to that used in the sleeve. The rake angle 70 of the tool, that is the angle which the tool surface 72 facing the cutting sleeve or interior of the link makes with the plane perpendicular to the link axis may typically be about 10°. A suitable relief angle 74 for the tool, that is the angle which the inner surface 76 makes with the link or shaft axis may typically be about 5°.

Figure 8A:
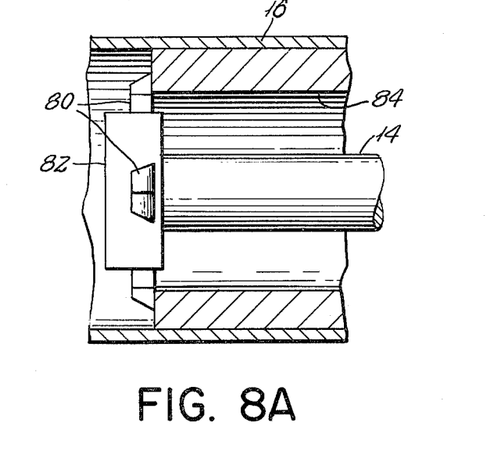
FIGS. 8A, 8B and 8C illustrate alternate embodiments for a cutting tool construction and arrangement according to the present invention.
Figure 8B:
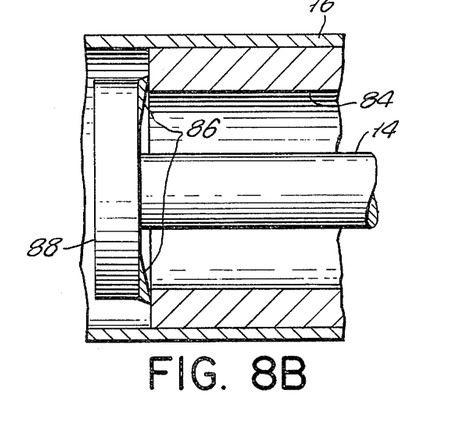
Figures 8C, 9:
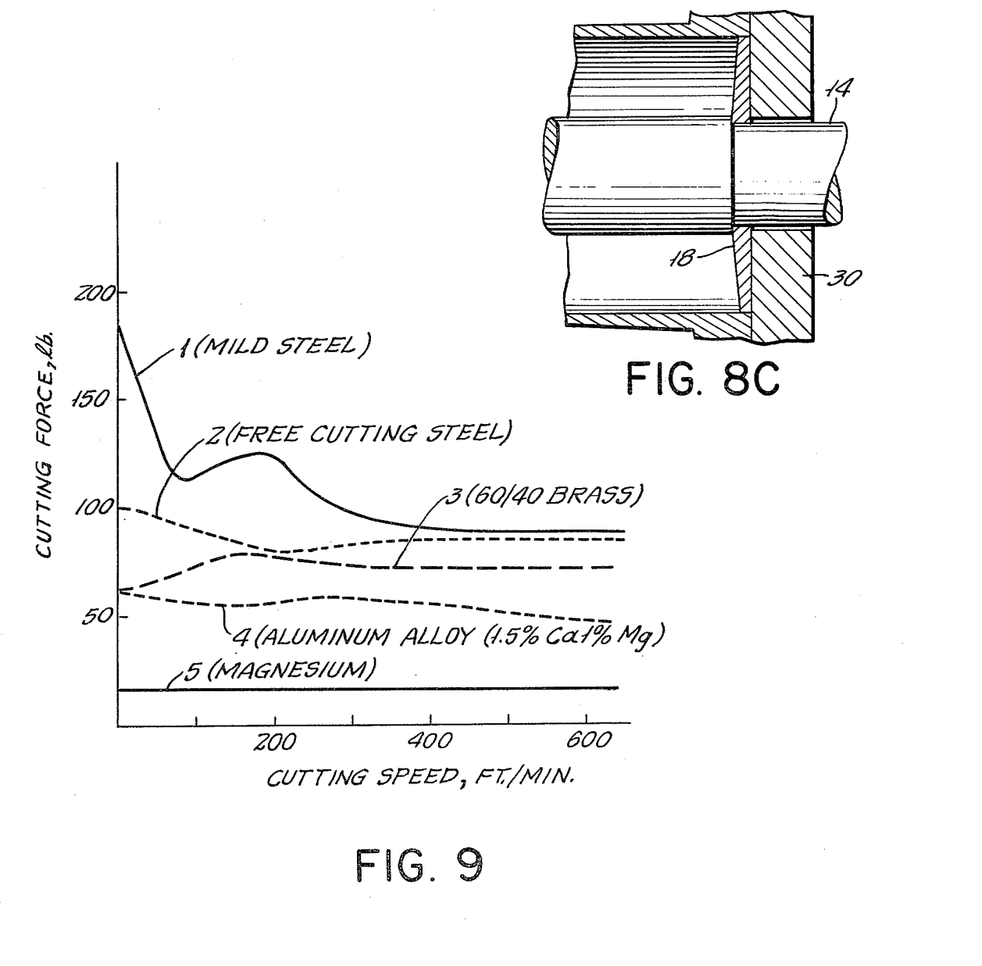
FIG. 9 shows cutting force vs. cutting speed curves for several materials and illustrates a desirable cutting material property.

The material used in the cutting sleeve preferably should have the property that the force required to cut is essentially independent of the speed of cutting. FIG. 9 shows cutting force as a function of cutting speed for several typical materials. For mild steel 1 the cutting force decreases rapidly as cutting speed increases from 0 to 100 feet per minute. If a material with a cutting force vs. cutting speed property such as this were used in the cutting sleeve, the cutting force retarding extension of the shaft would fall off rapidly as motion began, and the shaft would rapidly accelerate. In the use of materials such as free-cutting steel 2, 60/40 brass 3, bronze, magnesium, and certain aluminum alloys, the cutting force vs. cutting speed property is essentially constant. With a cutting sleeve comprised of one of these materials or another material with a similar cutting force vs. cutting speed property, the cutting force retarding extension of the shaft will not change appreciably with speed, and a relatively smooth shaft action will take place.

The cutting shaft of the present load control device should have high strength and be machinable, weldable, and fatigue-resistant. A suitable material would be a high strength alloy steel. The cutting shaft nut, for compatibility with the shaft, should comprise a similar material to that of the shaft. The purpose of the nut, in addition to retaining the sleeve on the cutting shaft, is to center the shaft and the cutting sleeve in the cylinder as they are drawn toward the cutting tool. So that the cutting sleeve is accurately centered the nut diameter should be as large as practical without interfering with the interior of the load control link body. The nut also prevents complete withdrawal of the shaft from the link at the end of the cutting stroke.

Buckling strength of the cutting sleeve is an important consideration. It must not buckle or otherwise deform as it is being cut. The cutting sleeve must not be so thin that it might buckle under axial compressive loads. The inner diameter of the cutting sleeve can be slightly larger than the cutting shaft diameter to afford some room for the cutting sleeve to deform inwardly during cutting and to take tolerances into account.

Variations in the design of the load control link can be made as will be apparent from the following discussion. FIGS. 1 and 2 show a preferred embodiment wherein the cutting tool is an annular collar fixed to the flange plate at the end of the body. The shaft and sleeve pass through the cutting tool and when the link actuates the cutting tool cuts the outside surface of the cutting sleeve.

Another variation (FIG. 8A) has the cutting tool comprising a series of cutting blades 80 protruding outwardly from a circular retaining disc 82 attached to the end of a cutting shaft 14. The cutting blades contact a cutting sleeve 84 concentric with and radially spaced from the shaft and connected to the body 16, so that when the load link actuates, the cutting blades cut on the inside surface of the sleeve.

This arrangement is more in keeping with conventional cutting tool technology. It would, however, require an increase in the load control link diameter because many cutting tools must be provided to cut sufficient metal and achieve the desired cutting load. Furthermore, the cutting tool will deform the cutting sleeve material outward, which may result in its becoming wedged against the inside wall of the link body, making removal of the sleeve and cutting tool relatively difficult. The use of a series of cutting tools may cause the shaft to twist as it moves, thus making the load level at which the link actuates unstable.

Another possible design (FIG. 8B) is to employ a circular cutting member 86 having its cutting edge on the outside periphery. The cutting blades are arranged adjacent an inner surface of a retaining disc 88 secured with shaft 14. This is similar to the previous described design, but has the advantage that the link diameter can be smaller because the peripheral cutting tool cuts more metal than the many individual tools of the embodiment of FIG. 8A. The loads withstood by the cutting tool are spread out over a larger surface, as well as having a smaller cutting depth. Also, there is no twisting problem. However, the disadvantage of deforming the cutting sleeve outwardly during actuation and wedging still makes removal of the tool and the sleeve difficult.

Another design (FIG. 8C) has the annular cutting collar 18 fixed to the inner surface of the flange plate 30 and the cutting shaft 14 passing through the cutting collar such that when the load link actuates the collar cuts directly on the surface of the cutting shaft. An advantage of this design is that the shaft also comprises the cutting material. Another advantage is that it does not require a cutting sleeve which must be designed to resist buckling. When the separate cutting sleeve is employed, it is compressed when the link is tensioned so that it has to be designed to resist high buckling loads. One disadvantage of this design is that the shaft has to be replaced each time the link actuates. Another disadvantage is that the shaft must be designed of a material which is strong enough to resist high tensile loads, but still has desirable cutting properties.

Various alternative methods may be used for retaining the cutting sleeve on the cutting shaft. The preferred embodiment employs the threaded nut or collar with circumferential slots. These slots facilitate flowing of fluid past the nut during actuation. Filling the cavity of the load control link with fluid can serve three functions. First the fluid can have special cutting lubrication properties to facilitate the cutting action. Second the fluid can have special corrosion inhibiting properties. Third, the fluid can serve to dampen the action of the load control link by slowing the withdrawl of the shaft as fluid is forced past the nut.

Clevises may be provided for both ends as shown in FIG. 1. This provides maximum facility for placement in series in a tension system. However, other fittings such as screw threads, eyes, or hooks are also possible.

Figure 6:
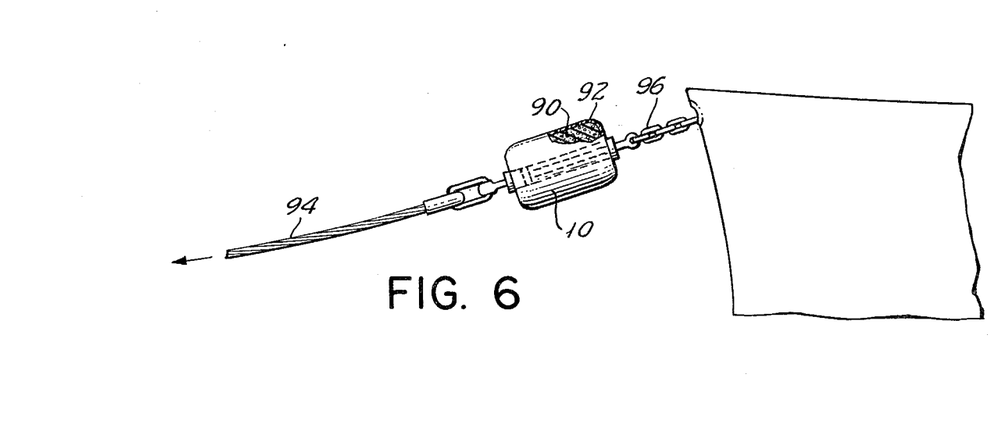
FIG. 6 illustrates a typical use of the present invention in a preferred embodiment comprising a single point mooring.

The embodiment of FIG. 6, the load control link device according to this invention is incorporated into a mooring hawser assembly of a single point mooring system. By designing the load control link to cut at a predetermined tension, the link will limit maximum loads in the mooring hawser. A buoy can be provided to support the weight of the load control link and the tanker chafing chain when the tanker is not moored. It may be preferable to make the load control link 10 self-buoyant by surrounding the housing with plastic or rubber foam 90 which is protected by a tough plastic cover 92.

The hawser 94 is attached to the cylinder end of the load control link. The chafing chain 96 is attached to the shaft end, by installing the link with the shaft end toward the chafing chain, any extension of the shaft can be observed from the deck of the moored tanker. If an extension of the shaft is observed, this is an indication that the hawser system had been overloaded.

After extension of the shaft has occurred, the link can be restored to its full stroke capacity by installing a new sleeve of the same diameter. All of the other components of the link are reusable. It also may be desirable to replace the cutting collar after extensive cutting has taken place. This will depend upon the quality of the collar itself. If desired, a suitable strain recording device or other load recording system can be incorporated into the link to provide a permanent record of the loads experienced by the hawser. A criteria for hawser replacement can be developed based on the data obtained from a strain or load record.

Figure 7:
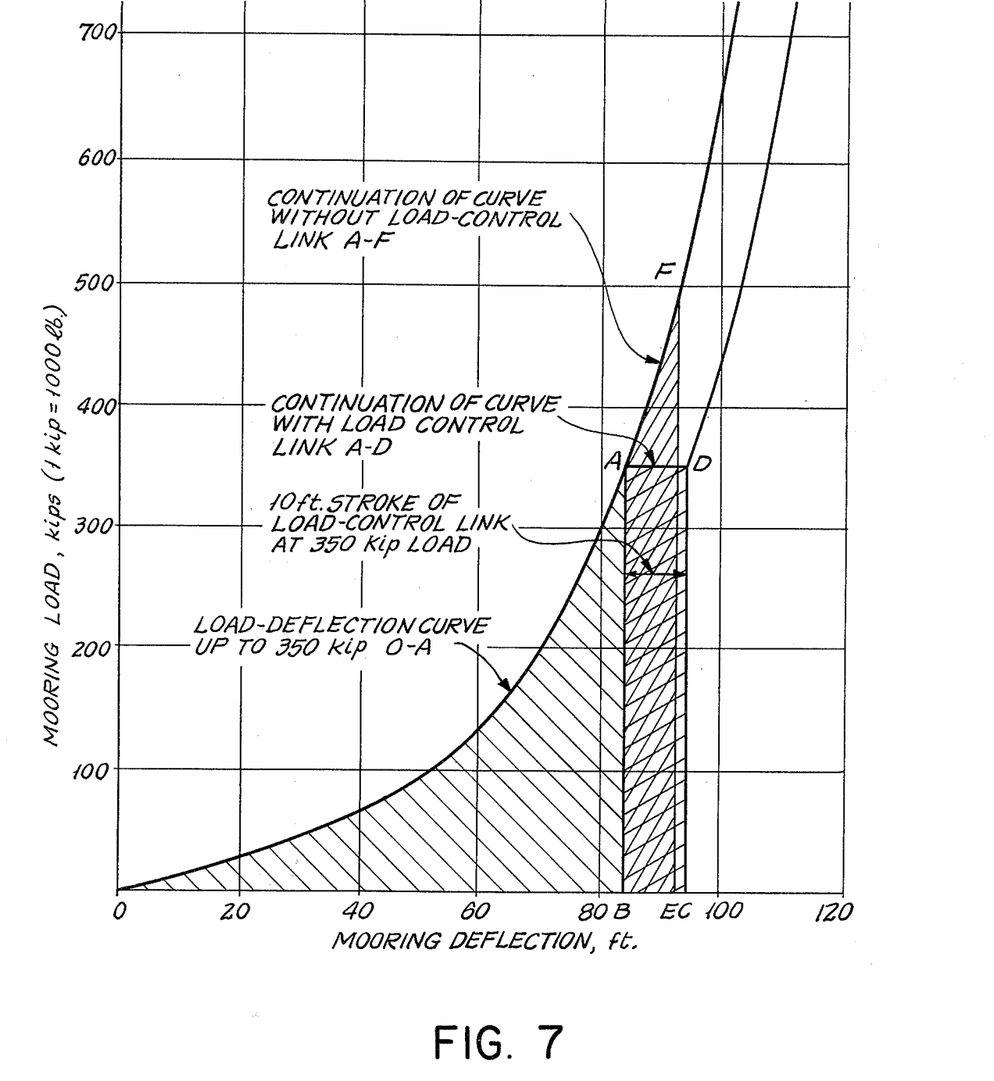
FIG. 7 is a typical single point mooring load-deflection curve showing performance of a load control link according to the present invention.

FIG. 7 is a load deflection curve for a typical SPM designed to man loarge tankers, with a design mooring load of 330 kips (1 kip=1000 lb.). This is the highest mooring load which is expected at the mooring. There is a chance of this mooring load being exceeded, for example, due to an accidental maneuver by the tanker or an environment more severe than the design environment. If an accident or environment occurs which produces a load of 500 kips in the mooring line, this would exert approximately 12,000 ft.-kips of energy on the system. If the mooring system is not designed with a sufficient safety factor or is not in good condition, it will fail.

Consider now that a load control link, according to the present invention, designed to cut at 350 kip and having a 10 ft. stroke is made a part of this mooring system. Up to the design cutting load approximately 8,500 ft.-kip of energy are stored in the system. In the 10 ft. stroke at 350 kip an additional 3500 ft.-kip of energy is dissipated by the load control link. At the end of the stroke, the mooring line load is still only 350 kip. Without the load control link, the 12,000 ft.-kip of energy exerted on the system would have caused a maximum load of 500 kip and might have failed the system, but the load control link has limited the load to 350 kip and saved the system.

While in the preferred embodiment the load control link has been shown employed in a single point mooring hawser system, other applications are also possible as discussed heretofore. One such application is on a crane or other lifting apparatus to prevent overstressing and to indicate when high loads are reached. In this case the load link can be placed between the lifting hook and the lifting wire and can be set to actuate at the design lifting limit of the crane or apparatus. Thus, when the crane operator attempts to lift a load exceeding the crane's lifting limit, the link would actuate, the cutting shaft would pull out, and the load being lifted would not rise. Until the end of the cutting rod is reached, the crane's lifting limit would not be exceeded. When the cutting rod extends, this would signal the lift operator that the crane design limit has been exceeded and the lift should not proceed. In this application the load control link would also prevent dynamic or shock loading from overstressing the crane or other lifting device. Loads supported by a crane sometimes gain significant momentum when being lowered or swung. When the motion of the load stops suddenly, the load's momentum may cause a very high shock load in the crane and possibly exceed the crane's lifting limit. The load control link would actuate when this limit is reached and absorb the momentum energy, thus preventing the load from being exceeded. Again, when the rod extends, this would signal the crane operator that the limit is being exceeded. This would prevent loads from exceeding design limits of structural components and other parts of the crane and thus prevent catastrophic failures. It also might prevent the crane from being overturned.

Another possible application is on supply boat moorings for offshore platforms, where a load control link can be provided in each of the mooring lines to function in the same manner as at a single point mooring as described above. Still further applications are in guyed structures such as radio towers or guyed production platforms in deep water. There load control links could be placed in each guy wire to function similar to the mooring situation to prevent excessive loads due to environmental forces. Still other possible applications are at conventional piers and multiple buoy moorings, where winches are sometimes designed to let line out when a set load is exceeded, thus limiting maximum load. The load control link can perform the same function. While the foregoing is a partial listing of the various applications of the load link according to the present invention, it obviously has broad utility in those situations which require limiting of a maximum load. Thus, the foregoing is not to be construed as necessarily limiting or setting forth all applications of this invention.

There has been shown and described an improved load control device for limiting maximum loads by the absorption of energy which has the advantages and benefits described heretofore. While a specific embodiment of the invention and certain modifications thereof have been shown and described in detail, it will be understood that inventions may be embodied otherwise without departing from the inventive principles. Various modifications to the invention will be apparent to those skilled in the art without departing from the claims appended hereto.

What is claimed is:

1. A device for controlling tension loads comprising: a housing, a shaft within said housing, a cutting member, cutting means bearing on said cutting member, said cutting member being cylindrical and said cutting means comprising a collar concentric about said cutting member and mounted on said housing, said collar having a cutting edge on its inside periphery and said cutting member having an outside diameter slightly larger than the inside diameter of said collar, and connection means attached at the opposite end of said housing or said shaft such that tension load applied to said connection means tends to produce relative motion between said cutting means and said cutting member resulting in energy dissipation by the action of cutting material from said cutting member.

2. The device of claim 1 wherein said cutting action occurs only when said applied tension load exceeds a predetermined value.

3. The device of claim 1 wherein the difference between the outside radius of said cutting member and the inside radius of said collar is essentially equal to a predetermined load at which cutting is to take place divided by the product of the circumference of said cutting member and the specific cutting energy of the material comprising said cutting member.

4. The device of claim 1 wherein said cutting member comprises a sleeve mounted about said shaft.

5. The device of claim 4 wherein said sleeve is removable from said shaft and is retained on said shaft by retaining means.

6. The device of claim 1 including means for sealing the interior of said device against leakage into said housing.

7. The device of claim 1 including means near the end of said shaft within said housing for preventing complete withdrawal of said shaft from said housing.

8. The device of claim 7 including means near end of said shaft within said housing for centering said shaft within said housing.

9. The device of claim 8 further comprising connection means at one end of said housing and at the opposite end of said shaft.

10. The device of claim 9 wherein a mooring line is attached to at least one of said connection means.

11. The device of claim 10 further comprising buoyant means attached to said device for supporting it in water.

12. The device of claim 2 wherein the cross-sectional area of the material cut from said cutting member by said cutting means by said cutting action is substantially equal to the predetermined value of said applied tension divided by the specific cutting energy of the material comprising said cutting member.

13. The device of claim 12 further comprising restricted opening means on one end of housing through which said shaft passes and enlarged restraining means on said shaft within said housing to prevent said shaft from being completely withdrawn from said housing.

14. The device of claim 13 further comprising connection means at one end of said housing and at the opposite end of said shaft.

* * * * *